United States Patent

Beydler

[15] 3,653,008

[45] Mar. 28, 1972

[54] SENSE AMPLIFIER SYSTEM FOR READ-ONLY COMPUTER MEMORY BANK

[72] Inventor: William W. Beydler, Laurel, Md.

[73] Assignee: Westinghouse Electric Corporation, Pittsburgh, Pa.

[22] Filed: June 4, 1970

[21] Appl. No.: 43,530

[52] U.S. Cl. ....................................340/174 M, 340/173 AM

[51] Int. Cl. ....................G11c 7/06, G11c 9/00, G11c 11/00

[58] Field of Search .....................340/173 SP, 173 AM, 174; 307/217, 251, 243, 230, 229, 259, 237, 254; 330/51

[56] References Cited

UNITED STATES PATENTS 3,069,665 12/1962 Bobeck.................................340/173

3,539,928 11/1970 Gardner.................................307/259

3,402,398 9/1968 Koerner..........................340/173 AM

*Primary Examiner*—Maynard R. Wilbur

*Assistant Examiner*—William W. Cochran

*Attorney*—F. H. Henson and E. P. Klipfel

[57] ABSTRACT

Described is a sense amplifier system for read-only computer memory banks having a bipolar output to distinguish "ones" and "zeros." The system is characterized in that each bit of a memory word consisting of several computer words can be read out with the use of only two integrated circuits, an operational amplifier and a gate. At the same time, the system provides for interfacing with various logic voltage levels. This is accomplished by connecting a diode to the output of the operational amplifier for each bit for strobing purposes and by using an emitter coupled logic gate both as a gating device and as a voltage level translating device.

6 Claims, 2 Drawing Figures

SENSE AMPLIFIER SYSTEM FOR READ-ONLY COMPUTER MEMORY BANK

BACKGROUND OF THE INVENTION

Figure 1:
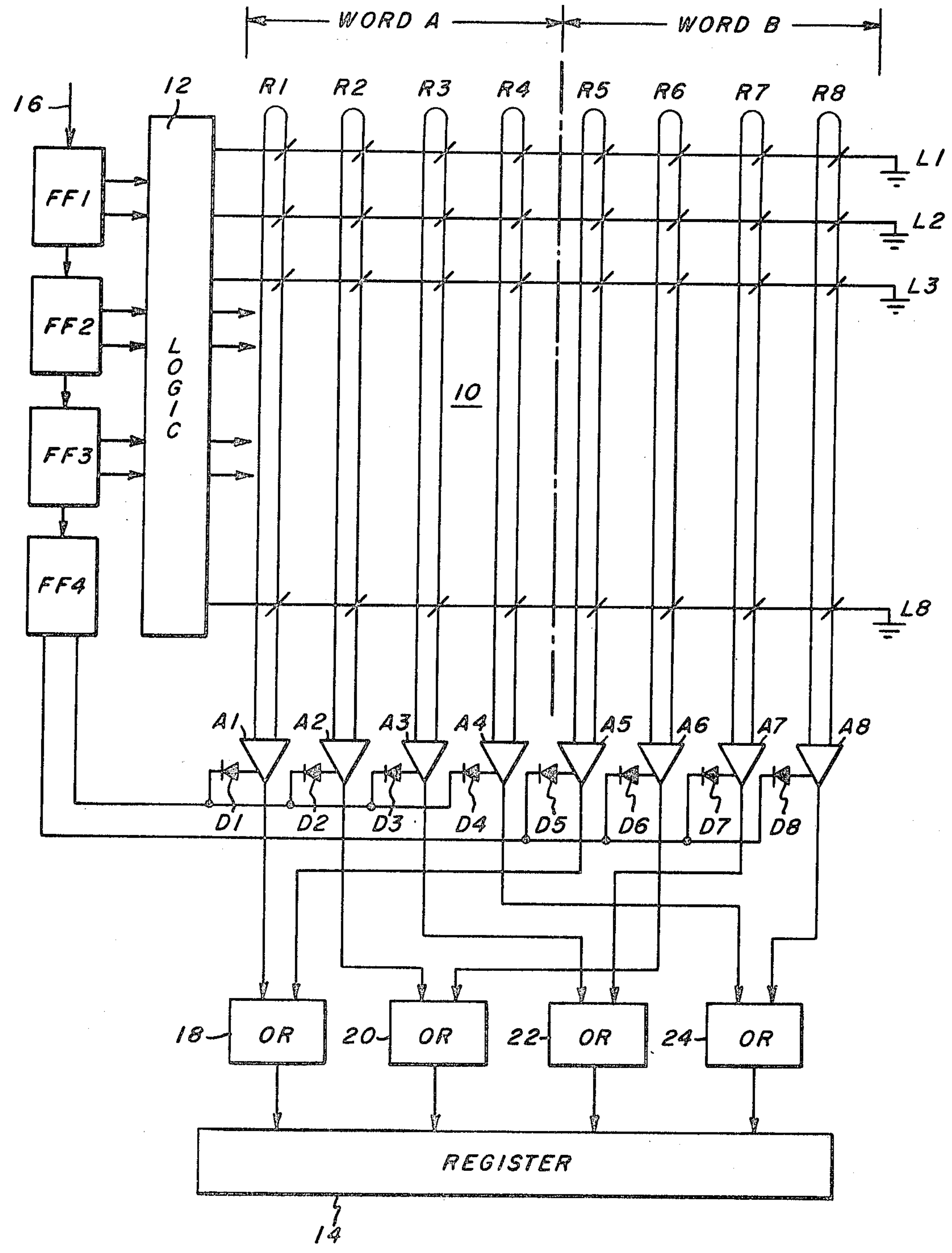

As used herein, the term computer memory systems of the "magnetic core type" means either a magnetic core memory or a magnetic plated wire memory or any such type of memory which employs bipolar output discrimination.

Computer memory systems of the magnetic core type, which provide bipolar pulses to distinguish stored "ones" and "zeros," require sense amplifiers having the capability of detecting signals of about 8 millivolts at a megahertz repetition rate. Because of the complexity of sense amplifiers, they require a substantial amount of space when constructed of conventional discrete electronic components. Consequently, memory systems with a large word length, or memory systems organized on a multiple word per access line basis, may become prohibitive in size when discrete components are used. Furthermore, as the physical size of the memory system is increased, system performance is degraded due to noise pickup in the long interconnecting lines from the magnetic core memories to the sense amplifiers.

Memory storage elements suitable for use in read-only memories lend themselves most easily to linear select or work organizations, that is, one in which the bits of an entire word are interrogated or read out with a single current pulse. The use of a driver per word in a memory containing several thousand words would be prohibitively expensive, with the result that a driver-switch diode matrix selection is usually performed. Even this type of selection requires one or more high-conductance diodes per word. Since the number of bits in a computer word is normally small, the memory cost per bit is rather high. To offset this, the memory is organized such that a memory word consists of several computer words. Stated in other words, the memory system is organized as a multiple word per access line. Thus, when a memory line is interrogated, several words are read-out simultaneously but only the desired word is retained.

Because of difficulty in low-level strobing and multiplexing, the output signals from the memory elements on the line being interrogated have heretofore been amplified in operational amplifiers before they were passed through strobing circuits. Thereafter, the signals were passed through OR circuits and finally again amplified in order to change the voltage level of the signal to that which could be accommodated by an output holding register flip-flop. Thus, four different circuits were required to read out each bit, making the system relatively complex and expensive.

SUMMARY OF THE INVENTION

As an overall object, the present invention seeks to provide a new and improved readout system for a read-only computer memory constructed from a minimum number of readily available integrated circuits.

More specifically, an object of the invention is to provide a readout system of the type described which is especially suited for use in a multiple word per memory line matrix.

The system of the invention is particularly adapted for use with a magnetic core computer matrix of the type having access lines of magnetic core elements, each line being divided into a plurality of computer words comprised of binary bits. All core elements in each access or memory line are simultaneously enabled for readout in memory line-to-memory line sequence, but only one computer word in a memory line is fed to a holding register.

In accordance with the invention, a plurality of amplifiers, preferably operational amplifiers, are provided in an arrangement in which the input of each amplifier is connected in parallel to corresponding bits in all of said access lines of magnetic core elements. Diodes are connected to the outputs of all of the amplifiers and adapted to clamp signals of one polarity representing stored "ones" in the memory bank. These diodes are caused to clamp all "one" signals at the outputs of the amplifiers except those amplifiers whose inputs are connected to core elements representing a computer word being read out. Finally, OR circuit means are connected to the outputs of the respective amplifiers which read out different computer words stored on the same memory line.

By causing the diodes to clamp all "one" signals at the outputs of the amplifiers except those connected to core elements representing a computer word being read out, the diodes serve as a strobing means without the necessity for separate circuitry for this purpose. The OR circuit means is preferably of the emitter coupled logic type and includes means for varying the output voltage of the OR circuit such that the output of the OR circuit can be matched in voltage to the required input for any holding register. In this manner, the necessity for a large number of circuits between the memory bank and a holding register is eliminated.

Figure 2:
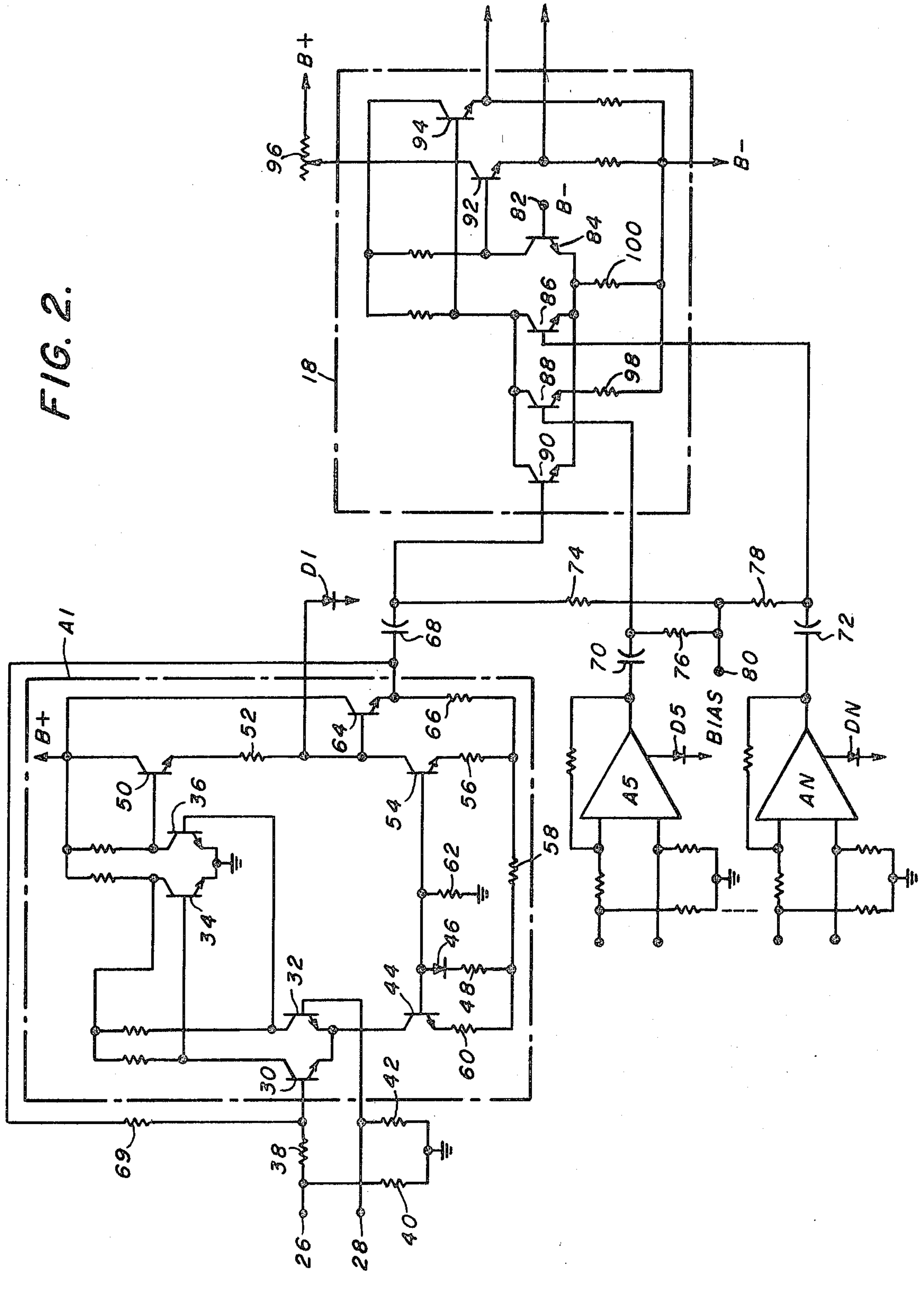

The above and other objects and features of the invention will become apparent from the following detailed description taken in connection with the accompanying drawings which form a part of this specification, and in which:

FIG. 1 is a schematic circuit diagram of a computer memory matrix showing the manner in which the readout system of the present invention is connected thereto; and FIG. 2 is a schematic circuit diagram showing the details of the operational amplifiers and output emitter coupled logic gate of the invention.

With reference now to the drawings, and particularly to FIG. 1, this invention is illustrated by a magnetic core computer memory matrix 10 is shown formed from 64 separate magnetic memory cores comprised of eight memory or access lines L1 through L8 arranged in eight columns R1 through R8. The matrix shown in FIG. 1 is, of course, simplified for purposes of explanation, it being understood that in an actual matrix the number of magnetic core elements will be greatly increased.

Current pulses for reading out the lines L1 through L8 are supplied from a logic network 12 connected to a counter comprised of flip-flops FF1 through FF4. In the operation of the system, a current pulse is supplied to line L1, followed by a pulse being applied to line L2, then line L3, and so on, until the entire matrix is read out. Whenever a current pulse is applied to any line, all of the magnetic core elements in columns R1 through R8 for that line are enabled so as to apply either a "one" or "zero" signal to corresponding operational amplifiers A1 through A8. As an example, it will be assumed that a "one" signal is positive and that a "zero" is negative.

Each one of the lines L1 through L8 represents a memory word made up of individual bits. However, as mentioned above, it is unusual for a computer word to utilize all of the bits in a memory word. Accordingly, the matrix of FIG. 1 is divided into two parts identified as WORD A and WORD B. The operation of the system is such that while all of the cores in line L1, for example, are simultaneously enabled for read out, only the binary information from the bits in WORD A or WORD B are applied to an output register 14. This is accomplished by means of diodes D1 through D8, in combination with flip-flop FF4.

Since there are eight memory lines in the matrix shown in FIG. 1, eight current pulses are required in sequence in order to completely read out the matrix. This is accomplished with the use of the first three flip-flops FF1 through FF3 and the logic network 12. As eight pulses are fed into the flip-flops via lead 16, eight current pulses will be applied to the lines L1 through L8 in sequence. During this time, the state of flip-flop FF4 is such that the cathodes of diodes D5 through D8 are grounded while diodes D1 through D4 have their cathodes connected to a source of positive potential. Under these circumstances, the diodes D5 through D8 will clamp positive or "one" signals at the outputs of amplifiers A5 through A8. Negative or "zero" signals, however, will appear at the outputs of the amplifiers A5 through A8. At the same time, diodes D1 through D4, having their cathodes connected to a source of positive potential, will pass both positive and negative or "one" and "zero" signals.

This action continues until the eighth pulse is applied to the flip-flops via lead 16; whereupon the state of flip-flop FF4 reverses and diodes D1 through D4 now have their cathodes grounded while the cathodes of diodes D5 through D8 are connected to a source of positive potential (i.e., are back-biased). With this arrangement, it can be seen that during one-half cycle of operation, only positive or "one" signals can appear at the outputs of amplifiers A1 through A4 in WORD A; whereas on the other half of the cycle only positive or "one" signals can appear at the outputs of amplifiers A5 through A8 in WORD B.

The outputs of amplifiers A1 and A5 in WORDS A and B, respectively, are connected to OR circuit 18. Similarly, the outputs of amplifiers A2 and A6 are connected to OR circuit 20; the outputs of amplifiers A3 and A7 are connected to OR circuit 22; and the outputs of amplifiers A4 and A8 are connected to OR circuit 24. The outputs of the OR circuits 24, in turn, are fed to the holding register 14.

As will be seen, the OR circuits 18 through 24 are responsive to positive or "one" signals only. They are not responsive to negative signals. Consequently, since positive signals are read out from only WORD A or WORD B at any one time, the information from a single computer word at any one time is fed into the register 14, notwithstanding the fact that the core elements of both WORD A and WORD B are enabled at the same time.

The details of the operational amplifiers and the OR circuits are shown in FIG. 2. In the arrangement of FIG. 2 only one OR circuit such as OR circuit 18 is shown and is enclosed by broken lines. This OR circuit is connected to operational amplifier A1, amplifier A5 and a third operational amplifier AN, it being understood that the number of operational amplifiers feeding into the OR circuit is not limited as in FIG. 1 wherein only two amplifiers are employed for each OR circuit. For example, a single memory line could be divided into six or eight different words, in which case each OR circuit would have six inputs.

The operational amplifier A1, for example, comprises a pair of input terminals 26 and 28 connected to the sense windings for all of the core elements in a column R1 through R8. The amplifier A1 is an integrated circuit operational amplifier comprising a first pair of NPN transistors 30 and 32 having their collectors connected to the bases of a second pair of NPN transistors 34 and 36. The input terminal 26 is connected through resistor 38 to the base of transistor 30 and is also connected to ground through resistor 40. Similarly, terminal 28 is connected to the base of transistor 32 and to ground through resistor 42.

The emitters of transistors 30 and 32 are connected to a constant current source comprising NPN transistor 44 having its emitter-base junction in shunt with diode 46 and resistor 48; while the collector of transistor 36 is connected to the base of NPN transistor 50 whose emitter is connected through resistor 52 to the collector of NPN transistor 54 having its base connected to the base of transistor 44 and its emitter connected through resistor 56 to resistor 58. The emitter of transistor 44 is also connected to the resistor 58 through resistor 60; while the bases of transistors 44 and 54 are connected to ground through resistor 62. The junction of the collector of transistor 54 and resistor 52 is connected to the base of emitter follower transistor 64 having its collector connected to a source of B+ potential and its emitter connected through resistor 66 to the lead 58. Output signals from the operational amplifier appear at the emitter of the transistor 64. The emitter of transistor 64 is also connected through resistor 69 to the base of transistor 30 to provide negative feedback which increases the bandwidth of the operational amplifier. The construction and operation of amplifiers A5 and AN is the same.

Whenever a positive or "one" signal appears at the output of the amplifier A1 on the emitter of transistor 64, the voltage on the base of transistor 64 will also be positive. Assuming, however, that the diode D1 is grounded, the positive signal on the base of transistor 64 will be clamped to ground, as will the output on its emitter. The same is true of diodes D5 and DN.

The outputs of the operational amplifiers A1, A5 and AN are connected through capacitors 68, 70 and 72 and resistors 74, 76 and 78 to a source of bias potential at point 80. The bias potential at point 80 is slightly more negative than the bias at point 82 in the gate circuit 18 applied to the base of transistor 84. Transistor 84 is in a differential amplifier arrangement with transistors 86, 88 and 90. The base of transistor 90 is connected through capacitor 68 to the output of amplifier A1; the base of transistor 88 is connected through capacitor 70 to the output of amplifier A5; and the base of transistor 86 is coupled through capacitor 72 to the output of amplifier AN.

The positive input signal at the output of any one of the amplifiers A1 through AN overcomes the normal bias, turning ON one of the transistors 86 through 90 and shutting OFF transistor 84 for the length of time that the signal appears at the base of any one of the transistors 86 through 90. An output then appears at both transistor 92 and transistor 94. A negative-going input applied to the base of any one of the transistors 86 through 90 representing a "zero," on the other hand, does not affect the output. By the use of resistor 98 in parallel with resistor 100 and by connecting the collectors of the transistors in circuit 18 to a source of positive potential via a potentiometer 96 and by varying the bias thus applied, the voltage level of the output signals from the gate circuit 18 can be varied.

The present invention thus provides a unique sensing amplifier arrangement for magnetic core memories by the addition of a diode to the output operational amplifiers and by taking advantage of the polarity discrimination possibilities of the read-only memory element output. Furthermore, by connecting several of the amplifiers to the inputs of an emitter coupled logic gate which serves as a logical "OR" function, the amplifier becomes especially suited for use in a multiple word per access line memory to form a minimum size system. Finally, the addition of a resistor to the gate circuit along with the use of the correct B+ voltage supply makes the gating circuit very versatile for interfacing with various logic levels.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a magnetic core computer matrix of the type comprising multiple word per access lines of magnetic core elements each representing a memory line divided into a plurality of computer words each comprised of binary bits, and wherein all core elements in each memory line have windings connected in series to provide one matrix coordinate for receiving and storing binary digits, said cores also having windings with windings on cores in the respective memory lines being connected in series to provide the second matrix coordinate orthogonal to said first coordinate to effect simultaneous enabling of cores in said memory lines for selective read-out of one computer word from a memory line in memory line-to-memory line sequence, into a holding register; the improvement of:

a plurality of amplifiers each having their respective inputs connected to one of said access lines, diodes connected to the outputs of all of said amplifiers and adapted to clamp signals of one selected polarity, means for causing said diodes to clamp the outputs of said amplifiers for signals of one polarity, except for those amplifiers whose outputs are connected to core elements representing digits of computer words being read out, and OR circuit means connected to the outputs of said amplifiers to selectively read out desired computer words.

2. The improvement of claim 1 wherein said amplifiers comprise operational amplifiers which include resistors connecting their outputs to their inputs.

3. The improvement of claim 1 wherein said OR circuit means comprise emitter coupled logic gates.

4. The improvement of claim 3 wherein said emitter coupled logic gates include means for varying the voltage level of output signals therefrom.

5. The improvement of claim 1 wherein each OR circuit is connected to a plurality of operational amplifiers, each of said amplifiers in said plurality being connected to cores representing corresponding bits in computer words.

6. The improvement of claim 1 including means for causing read out of said computer matrix, said diodes being controlled by said last-named means.

* * * * *